United States Patent
Ottino (10) Patent No.: US 7,192,076 B2
(45) Date of Patent: Mar. 20, 2007

(54) MODULAR LOCK FOR A DOOR OF A MOTOR VEHICLE AND DOOR PROVIDED WITH THIS LOCK

(75) Inventor: Franco G. Ottino, Giuliano Terme (IT)

(73) Assignee: Intier Automotive Closures S.p.A. (IT)

( * ) Notice: Subject to any disclaimer, the term of this patent is extended or adjusted under 35 U.S.C. 154(b) by 0 days.

(21) Appl. No.: 10/492,936

(22) PCT Filed: Oct. 18, 2002

(86) PCT No.: PCT/IT02/00671

§ 371 (c)(1),
(2), (4) Date: Oct. 18, 2004

(87) PCT Pub. No.: WO03/033847

PCT Pub. Date: Apr. 24, 2003

(65) Prior Publication Data

US 2005/0104383 A1    May 19, 2005

(30) Foreign Application Priority Data

Oct. 19, 2001   (IT) ........................ TO2001A1000

(51) Int. Cl.
*B60J 5/04*   (2006.01)

(52) U.S. Cl. ................................... 296/146.1

(58) Field of Classification Search ............. 296/146.1, 296/146.2, 146.4, 146.5, 146.9; 49/501, 49/502, 503
See application file for complete search history.

(56) References Cited

U.S. PATENT DOCUMENTS

| | | | |
|---|---|---|---|
| 4,342,209 A * | 8/1982 | Kleefeldt | ..................... 70/264 |
| 4,364,249 A | 12/1982 | Kleefeldt | |
| 4,487,441 A * | 12/1984 | Miyamoto et al. | ....... 292/336.3 |
| 4,505,500 A | 3/1985 | Utsumi et al. | |
| 4,603,894 A * | 8/1986 | Osenkowski | ................ 292/216 |
| 4,848,829 A | 7/1989 | Kidd | |
| 4,882,842 A | 11/1989 | Basson et al. | |

(Continued)

FOREIGN PATENT DOCUMENTS

DE          195 37 504 A        4/1997

(Continued)

*Primary Examiner*—H Gutman
(74) *Attorney, Agent, or Firm*—Clark Hill PLC (57) ABSTRACT

A modular lock (1) for a door (2) of a motor vehicle is provided with a closure module (16) and a control module (17). The closure module (16) is provided with a first support body (18) which is integral with the door (2), and a closure mechanism (19) which is supported by the first support body (18) and can be connected to a striker (3) which is integral with an upright of the door (2), in order to give rise to closure of the door (2) itself. The control module (17) is provided with a second support body (20) which is integral with the door (2), and with an actuating assembly (21) which is supported by the second support body (20), and can control release of the closure mechanism (19) from the striker (3). The lock (1) is also provided with a flexible transmission (23) for remote connection between the actuating assembly (21) and the closure mechanism (19), in order to permit remote positioning of the closure module (16) and the control module (17) on the door (2).

7 Claims, 5 Drawing Sheets

U.S. PATENT DOCUMENTS

| | | | |
|---|---|---|---|
| 5,234,237 A * | 8/1993 | Gergoe et al. | 292/201 |
| 5,666,834 A * | 9/1997 | Inoue | 70/237 |
| 6,036,501 A | 3/2000 | Wojewnik et al. | |
| 6,045,168 A * | 4/2000 | Johnson et al. | 292/216 |
| 6,050,117 A * | 4/2000 | Weyerstall | 70/277 |
| 6,168,216 B1 * | 1/2001 | Nakajima et al. | 292/201 |
| 6,398,271 B1 * | 6/2002 | Tomaszewski et al. | 292/216 |
| 6,409,233 B1 * | 6/2002 | Hanaki | 292/144 |
| 6,530,251 B1 * | 3/2003 | Dimig | 70/237 |
| 6,715,806 B2 * | 4/2004 | Arlt et al. | 292/201 |
| 6,823,628 B2 * | 11/2004 | Morrison et al. | 49/502 |
| 6,843,085 B2 * | 1/2005 | Dimig | 70/237 |
| 6,969,108 B2 * | 11/2005 | Fukumoto et al. | 296/155 |

FOREIGN PATENT DOCUMENTS

| | | |
|---|---|---|
| EP | 0 987 390 A | 3/2000 |
| GB | 2 271 374 A | 4/1994 |
| WO | WO 99/00572 | 1/1999 |
| WO | WO 99/32312 A | 7/1999 |

* cited by examiner

MODULAR LOCK FOR A DOOR OF A MOTOR VEHICLE AND DOOR PROVIDED WITH THIS LOCK

TECHNICAL FIELD

The present invention relates to a modular lock for a door of a motor vehicle and to a door provided with this lock.

BACKGROUND ART

As is known, the doors of motor vehicles generally comprise an upper portion in the form of a frame, which defines a window which is closed by movable glass, when the glass is raised, and a lower, box-type portion, which is formed by an outer panel and an inner panel, which are connected at one end by a head edge, and define between one another a cavity, in which there are commonly accommodated the glass, when it is lowered, and various components which are secured to the panels themselves, including for example a lock and a glass-raising device. Frequently, the cavity of the door is subdivided by an intermediate baffle, which is impermeable to water, into a dry innermost region, which is delimited by the inner panel, and into a humid outermost region, i.e. a region which is subjected to the presence of water and atmospheric humidity, is delimited by the outer panel, and commonly accommodates the glass when it is lowered.

Conventional locks are generally fitted inside the humid region of the door cavity, in a position which is suitable for interaction with a striker, which is integral with a fixed upright of the door itself.

In particular, conventional locks substantially comprise a closure mechanism which can be releasably connected to the striker in order to give rise to closure of the door, and an actuating assembly, which can command release of the closure mechanism from the striker, and can be connected to the manual control elements which are associated with the door of the motor vehicle, such as the inner and outer handles, and the key locking mechanism.

More specifically, the actuating assembly generally comprises an inner control lever, which is connected to the inner handle of the door, an outer control lever, which is connected to the outer handle of the door, and a kinematic security mechanism, which can be actuated by means of a key from the exterior of the motor vehicle, and by means of a knob and/or the inner handle, and can assume a configuration in which the security mechanism is applied, wherein the outer control lever is rendered inoperative, and thus opening of the door by means of the outer handle is inhibited, and a configuration in which the security mechanism is released, wherein opening of the door by means of the outer handle is enabled.

In vehicles which are provided with central locking of the doors, the actuating assembly additionally comprises a door-lock actuator and any electrical components for signalling and control, such as micro-switches.

Locks of the type described are known, in which the closure mechanism and the actuating assembly are integrated and are assembled sequentially on a single support body.

This solution, which can be defined as integrated, has some disadvantages from the production and functional point of view. Firstly, although the production cycles are inflexible, various versions of the locks must be produced (for front or rear doors, locks with mechanical or electrical action), as well as versions for different applications: integrated and sequential assembly does not make it possible to transfer easily from one version of the lock to another, or to vary the design easily, according to the market requirements. In addition, components of the lock can function, and therefore be inspected, only when the assembly is completed; if the inspection reveals an abnormality it is therefore not easy to determine the causes of this immediately.

In order to eliminate these disadvantages, modular locks have become commonplace, in which the support body consists of two or more shells, which each support and accommodate a certain number of components of the lock, and are fitted in a modular manner. More particularly, modular locks are known which substantially comprise a shell for support and accommodation of the closure mechanism, and a shell for support and accommodation of the actuating assembly; these shells are connected to one another, for example by means of fast coupling devices, in order to constitute together an integrated unit. The modular structure of these locks makes it possible both to produce and inspect independently the closure mechanism and the actuating assembly, and to obtain economies of scale, by producing a single closure module, to which there are connected different versions of control modules, which make it possible to "personalise" the lock for various applications, i.e. with fully mechanical action, with door locks, and/or with signalling functions.

Whether they are provided with a single support body or are of the modular type, in order to be able to co-operate with the striker, the locks described must be disposed in a pre-determined position inside the cavity of the lower portion of the door. This causes problems firstly of dimensions and shape of the lock and of the component modules, since the size of the lock itself must be suitable for the space available. In addition, as previously stated, in order to be able to interact with the striker, the lock is normally positioned inside the humid region of the door cavity. This makes it necessary to take an entire series of precautions in order to ensure that contact with water by the lock does not adversely affect the functioning of the lock, for example it makes it necessary to use impermeable electrical components, which are decidedly more costly than similar components for which impermeability to water is not required.

Finally, in the case of doors which are connected to the upright by means of a hinge, the normal positioning of the lock on the side of the door opposite that on which the hinge is located, means that the electrical, electronic and mechanical components of the lock have to be strong enough to withstand the inertia stresses derived from closing the door, which stresses are obviously all the greater, the greater the distance of the components from the hinge itself.

EP-A-0987390 and U.S. Pat. No. 4,505,500 disclose a utility module to simultaneously control a couple of locks of a motor vehicle door by remote connection elements, such as Bowden cables.

GB-A-2271374, WO-A-9900572 and U.S. Pat. No. 4,364,249 disclose anti-theft vehicle door locks having remote connection means, such as Bowden cables, for connecting remote lock modules.

DISCLOSURE OF THE INVENTION

The object of the present invention is to provide a door for a motor vehicle, which makes it possible to eliminate simply and economically the above-described disadvantages.

The said object is achieved by the present invention, in that it relates to a door for a motor vehicle, as claimed in claim 1.

BRIEF DESCRIPTION OF THE DRAWINGS

In order to assist understanding of the present invention, a preferred embodiment is described hereinafter, purely by way of non-limiting example, and with reference to the attached drawings, in which.

BEST MODE FOR CARRYING OUT THE INVENTION

Figure 1:
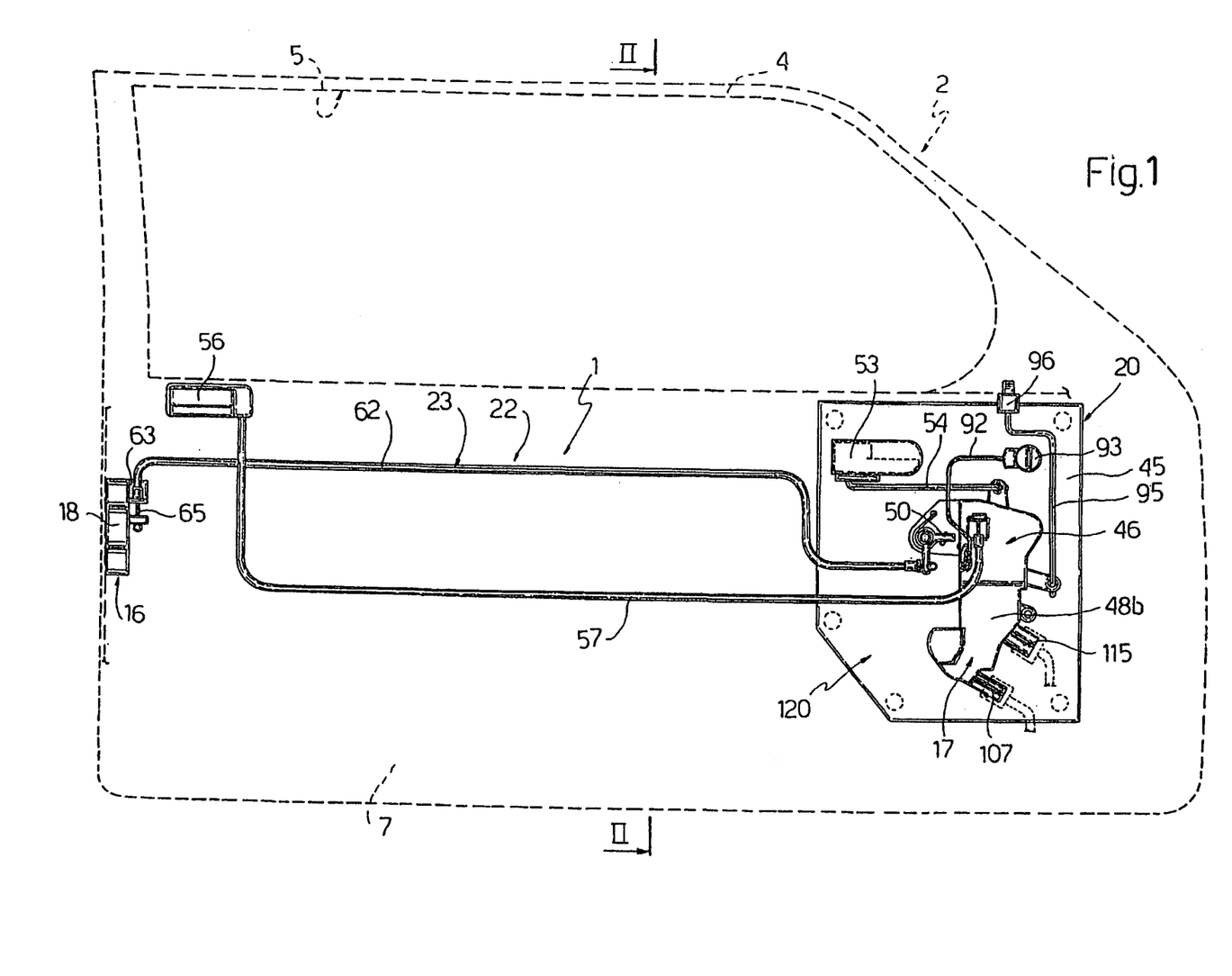
FIG. 1 is a lateral schematic view of a door of a motor vehicle, provided with a modular lock according to the present invention, a control module of which is incorporated in a pre-assembled functional unit.
Figure 3:
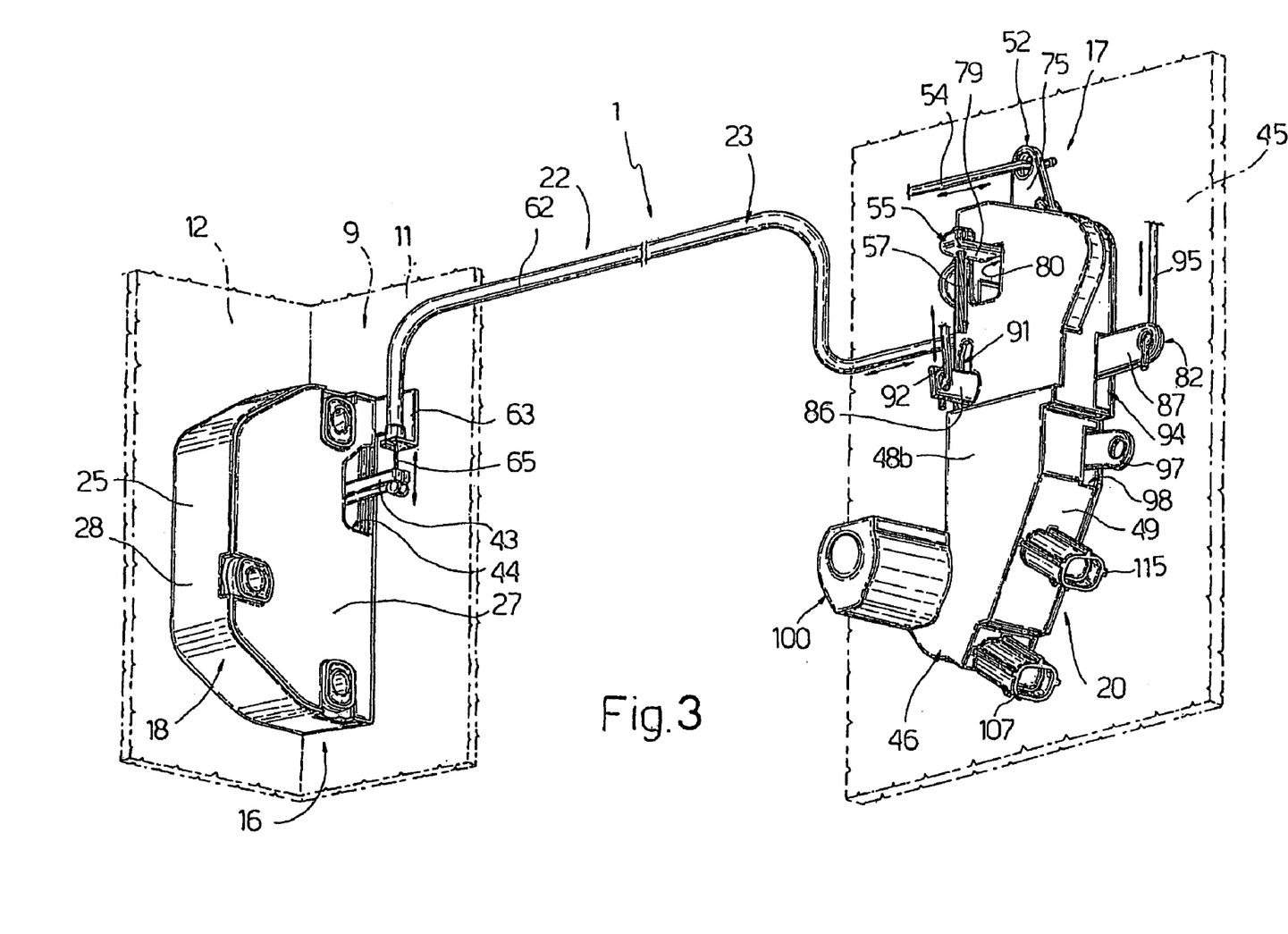
FIG. 3 is a perspective view on an enlarged scale of the lock in FIG. 1.

With reference to FIGS. 1 and 3, 1 indicates as a whole a modular lock for a door of a motor vehicle (not illustrated), in particular for a door which can be hinged on the frame of the motor vehicle itself.

The lock 1 can interact in a known manner with a striker 3 (FIG. 4), which is integral with an upright (not illustrated) of the door 2, and is part of a centralised system for closure of the doors of the motor vehicle, the operativity of which is controlled by the electrical system of the motor vehicle, in a manner which is known and not illustrated since it does not form part of the present invention.

Figure 2:
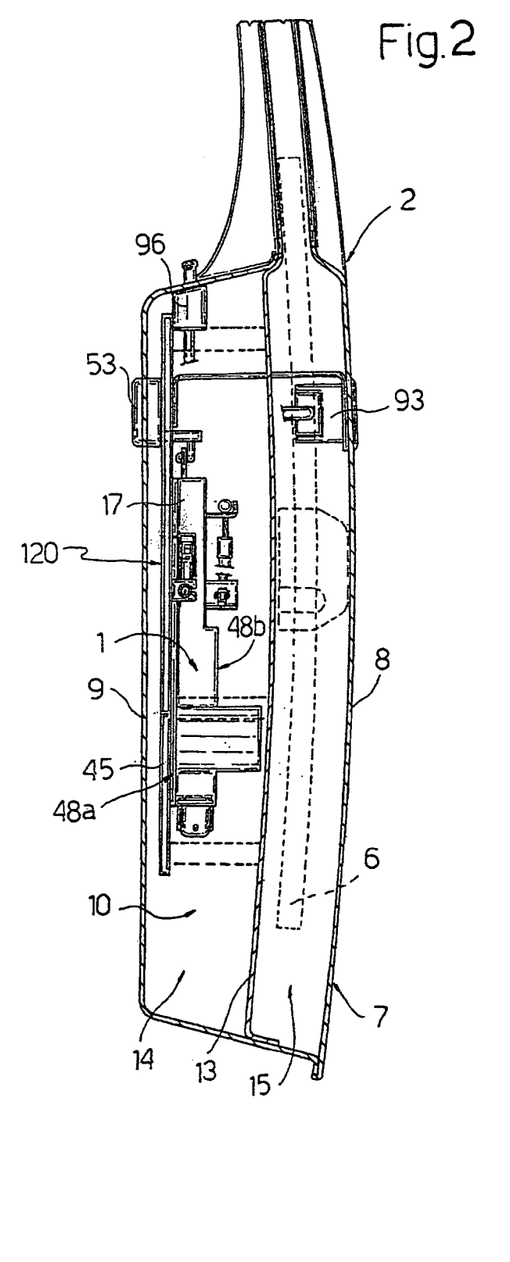
FIG. 2 is a cross-section according to the line II—II in FIG. 1.

With reference to FIGS. 1 and 2, the door 2 comprises in a known manner an upper portion 4 in the shape of a frame, which defines a window 5 which is closed by movable glass 6, when the glass is raised, and a lower, box-type portion 7, which is formed by an outer panel 8 and an inner panel 9, which define between one another a cavity 10, in which there are accommodated the glass 6, when it is lowered, and various components which are secured to the panels 8,9 themselves, including the lock 1. For this purpose, the inner panel 9 has an aperture (which is not shown in the attached figures) for introduction of the said components inside the cavity 10.

In greater detail, the inner panel 9 has a main portion 11, which is substantially flat and parallel to the outer panel 8, and opposite edges of lateral ends, only one of which can be seen in FIG. 3, and is indicated as 12, which extend at right-angles in a projecting manner from the opposite lateral ends of the main portion 11 itself, and are connected to the outer panel 8.

The door 2 also has an inner baffle 13 (FIG. 2), which is impermeable to water, is interposed between the panels 8 and 9, and subdivides the cavity 10 into a dry region 14, which is delimited by the inner panel 9, and a humid region 15, i.e. a region which is subjected to the presence of water and atmospheric humidity, and is delimited by the outer panel 8.

The lock (FIGS. 1 and 3) comprises substantially a closure module 16 and a control module 17.

The closure module 16 comprises substantially a support body 18 which is secured to the lower portion 7 of the door 2, and a closure mechanism 19 which is supported by the support body 18 and can be releasably connected to the striker 3 in order to give rise to closure of the door 2.

The control module 17 comprises a support body 20, which is also secured to the lower portion 7 of the door 2, and an actuating assembly 21, which is supported by the support body 20, can command release of the closure mechanism 19 from the striker 3, and, as will be described in detail hereinafter, includes a plurality of levers and electrical components.

According to an important aspect of the present invention, the lock 1 also comprises means 22 for remote connection, which connect the actuating assembly 21 to the closure mechanism 19, in order to permit remote positioning of the closure module 16 and the control module 17 inside the cavity 10 of the door 2.

Preferably, the means 22 for remote connection comprise a flexible cable transmission 23, of the Bowden type. Alternatively, the means 22 for remote connection could comprise a rigid transmission, for example a rod or a tie rod. In addition, the control module 17 could be connected at any distance from the closure module 16, and thus could be in the immediate vicinity of the latter, or spaced considerably from the latter.

In order to interact with the striker 3, the closure module 16 must be placed inside the humid region 15 of the cavity 10 of the door 2. On the other hand, the control module 17 can be placed in the required position inside the cavity 10 of the door 2, and preferably inside the dry region 14 of the cavity 10 itself.

Figure 4:
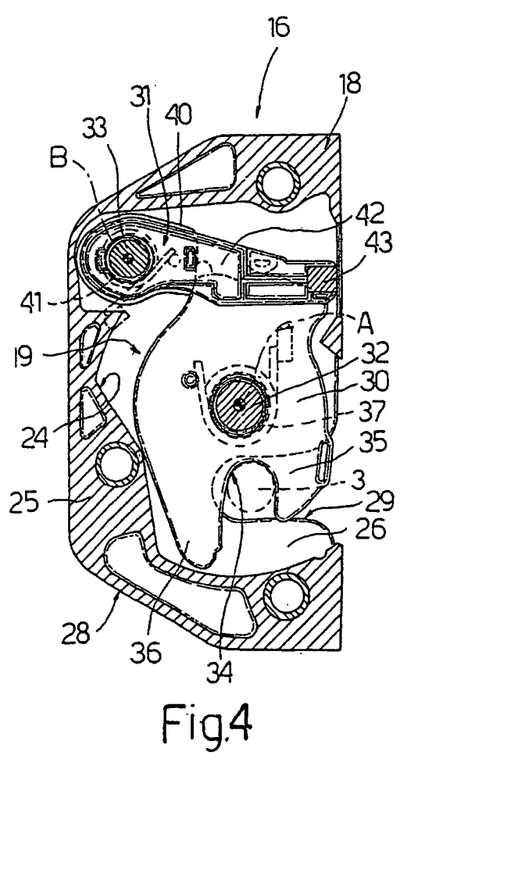
FIG. 4 is an elevated view in cross-section of a closure module of the lock in FIGS. 1 and 3.

With particular reference to FIGS. 3 and 4, the support body 18 of the closure module 16 has a prismatic box shape, and defines in its interior an opening 24 for accommodation of the closure mechanism 19.

Preferably, the support body 18 has a sandwich structure, and consists of an intermediate shell 25, which is made of plastics material, and a pair of metal base plates 26, 27, which have a polygonal shape, are fitted on opposite sides of the shell 25, and delimit together with the latter the opening 24.

The support body 18 is secured to the plate 26 at the end edge 12 of the inner panel 9 of the door 2, and with its own side 28 level with the main portion 11 of the panel 9 itself.

The support body 18 also has a lateral aperture 29 in the shape of a C, for introduction of the striker 3, which extends partly along the plate 26, and partly along a corresponding section of the side 28. The aperture 29 is also disposed in the position of an angle aperture (not shown in the attached figures), provided in the lower portion 7 of the door 2, at the corner area defined between the end edge 12 and the main portion 11 of the inner panel 9.

The closure mechanism 19 (FIG. 4) comprises in a known manner a fork 30 and an pawl 31, which are pivoted around respective pins 32, 33, extend between the plates 26 and 27, are supported integrally by the latter, and have respective axes A, B, which are parallel to one another, and at right-angles to the plates 26, 27 themselves.

The fork 30 consists of a shaped metal plate, which is covered with plastics material, is pivoted at its own intermediate portion around the pin 32, and has a peripheral seat in the shape of a C, which can accommodate the striker 3, and is delimited laterally by a pair of teeth 35, 36.

The fork 30 is subjected to the return action of a spring 37, which is wound around the pin 32, and is connected to the fork 30 itself and to a portion of the support body 18; in particular, the fork 30 is thrust by the spring 37 towards a position of opening (not illustrated), in which its own tooth 35 abuts laterally the lateral edge of the aperture 29, and its own seat 34 faces substantially in the same direction as the aperture 29 itself, such as to permit engagement and release of the striker 3.

Under the thrust of the striker 3, and after the door 2 has been shut, the fork 30 rotates around the axis A, from the position of opening to a position of closure, in which the striker 3 is locked in the seat 34, and the tooth 35 intercepts the aperture 29 in a known manner, and prevents it from moving away.

The pawl 31 comprises a metal engagement element 40, which is substantially coplanar to the fork 30, is pivoted around the pin 33, and has an end corner which is in the shape of an L, and can be snapped inside a peripheral edge of the fork 30 itself, in order to lock the latter in the position of closure, in a manner such that it can be released.

The engagement element 40 is thrust in a known manner towards the peripheral edge of the fork 30 by a spring 41, which is wound around the pin 33 and is connected to the engagement element 40 itself and to a portion of the support body 18.

The pawl 31 additionally comprises an actuating arm 42, which is preferably made of plastics material, and is also pivoted around the pin 33, is connected angularly to the engagement element 40, and is connected to the transmission 23 in order to receive opening forces from the actuating assembly 21 of the control module 17.

The actuating arm 42 has a shape which is elongate in a direction transverse to the axis B of the pin 33 and to the side 28 of the shell 25, and it is disposed such that it superimposes the engagement element 40 and projects relative to the engagement element 40 itself.

The actuating arm 42 is pivoted on the pin 33, at its own end, and supports in a projecting manner, at its own opposite end, a projecting part 43 which extends outside the support body 18 via a through aperture 44 in the plate 27 and is connected to the transmission 23, as will be described in greater detail hereinafter.

With reference to FIGS. 1, 2 and 3, the support body 20 for the control module 17 comprises substantially a prismatic shell 46 made of plastics material which defines in its interior an opening for accommodation of the actuating assembly 21. Advantageously, the shell 46 is secured in a projecting manner to a support plate 45, which in turn is integral with the inner panel 9 of the door 2.

In particular, the shell 46 has a pair of substantially flat base plates 48a, 48b, which are connected peripherally by a lateral edge 49 with a thickness which is reduced compared with the dimensions of the plates 48a, 48b themselves.

Figure 5:
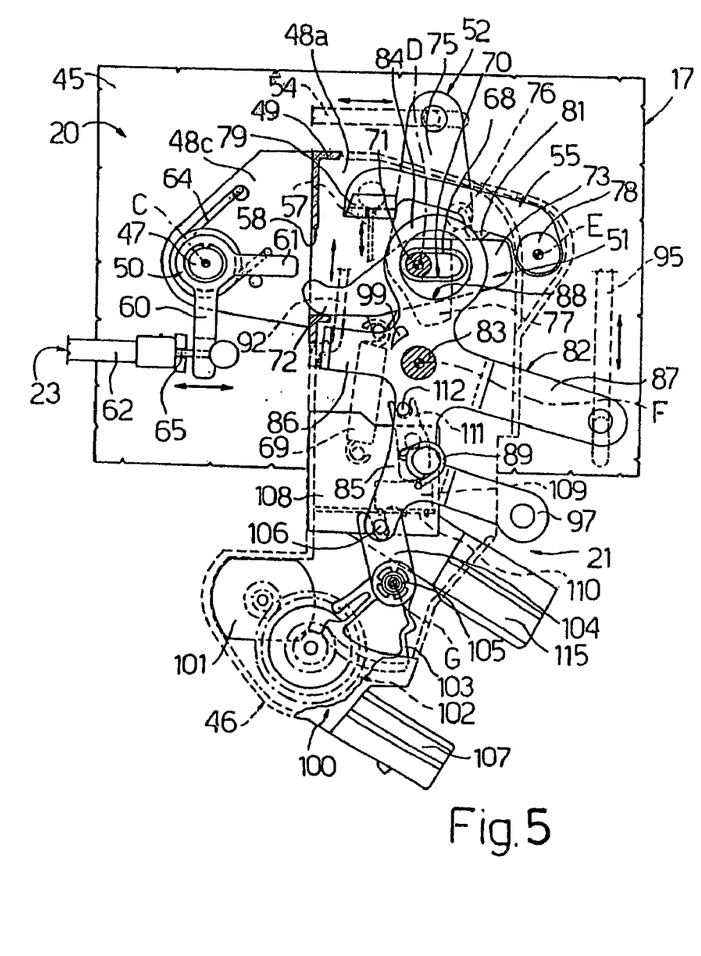
FIGS. 5 and 6 illustrate in lateral view, and with parts removed for the sake of clarity, the control module of the lock in FIGS. 1 and 3, in two different operative configurations.
Figure 6:
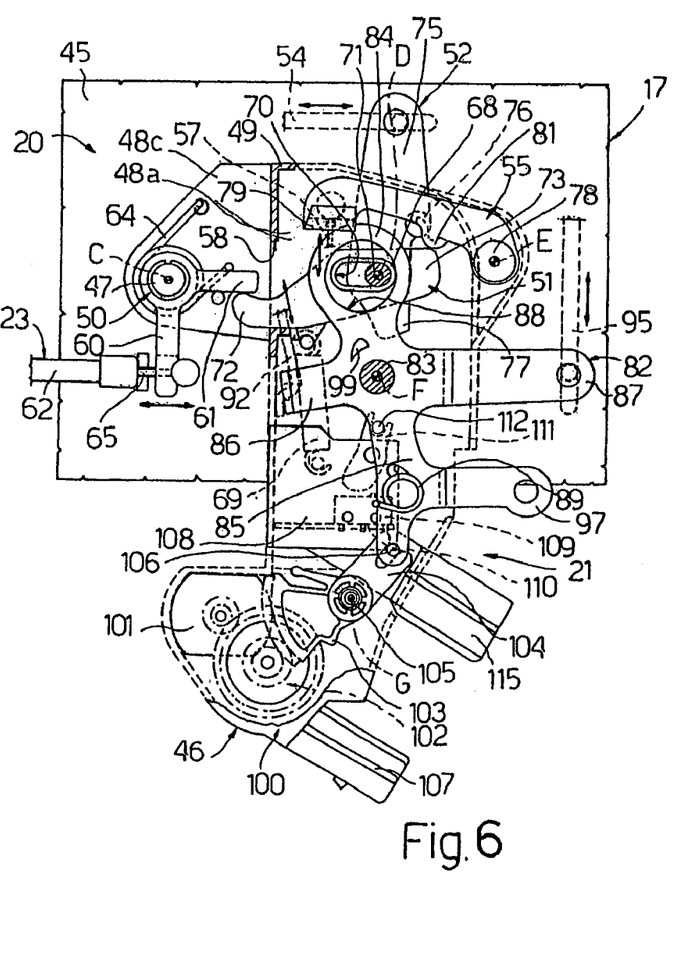

As can be seen in FIGS. 3, 5 and 6, and as will be described in detail hereinafter, the actuating assembly 21 comprises a plurality of levers which extend on planes parallel to the plates 48a, 48b, and are pivoted on respective pins which are integral with and at right-angles to the plates 48a, 48b themselves.

The actuating assembly 21 comprises a rocker lever 50 which is connected to the projecting part 43 of the actuating arm 42 of the pawl 31 by means of the transmission 23 and defines an output member for the assembly 21 itself, and an opening lever 51 which can co-operate selectively with the lever 50, in order to release the pawl 31 from the fork 30 and give rise to opening of the lock 1.

The actuating assembly 21 additionally comprises an inner control lever 52 which is connected to an inner handle 53 of the door 2, preferably by means of a tie rod 54, and co-operates with the lever 51 in order to open the lock 1 from the interior of the motor vehicle, and an outer control lever 55 which is connected to an outer handle 56 of the door 2, preferably by means of a flexible cable transmission 57 of the Bowden type, which is altogether similar to the transmission 23, and co-operates with the lever 51 in order to open the lock 1 from the exterior of the motor vehicle itself.

Alternatively, the inner handle 53 could be connected to the lever 52 by means of a flexible cable transmission, and the outer handle 56 could be connected to the lever 55 by means of a rigid transmission, for example a tie rod.

With reference to FIGS. 5 and 6, the lever 50 is substantially in the shape of an L and is pivoted on a projection 48c of the plate 48a around a pin 47 with an axis C, which is integral with and at right-angles to the plate 48a itself. The lever 50 has a flat shape and is connected to the plate 48a in a position facing a through aperture 58 provided in the lateral edge 49 of the shell 46, from which the lever 51 can project. The lever 50 comprises a first arm 60 which is connected to the transmission 23, and a second arm 61 which faces the aperture 58.

In particular, the transmission 23 comprises a sheath 62 which has opposite ends secured respectively to the plate 45 and to a projection 63 of the support body 18 which extends from the plate 27, and a cable 65 which is fitted such as to slide axially inside the sheath 62 and is connected at its own opposite ends, respectively to the arm 60 of the lever 50 and to the projecting part 43 of the actuating arm 42 of the pawl 31. In this case, the sheath 62 passes in a sealed manner, which is not illustrated, through the baffle 13 of the cavity 10 in the door 2.

The lever 50 is kept in position by a helical spring 64 of a conventional type, which is wound around the pin 47, in a position of rest, which is illustrated in FIGS. 5 and 6, in which the arm 61 extends in a position facing the aperture 58.

The aperture lever 51, which is advantageously made of plastics material, has a flat, elongate shape and has an intermediate longitudinal slot 70, which is contained inside an edge 68 which projects relative to the surface of the lever 51 itself, which faces the plate 48b of the shell 46. The slot 70 is engaged by a fixed pin 71, which is supported between the plates 48a and 48b, and has an axis D which is at right-angles to the latter.

The lever 51 has an end portion 72 which engages the aperture 58 and can co-operate by thrusting, with the arm 61 of the lever 50, in order to rotate the lever 50 itself around the axis C, towards a position of opening (not illustrated), in which it gives rise to traction on the cable 65 of the transmission 23, such as to release the engagement element 40 of the pawl 31, from the fork 30.

The lever 51 is mobile parallel to the plates 48a, 48b; more particularly, the lever 51 can rotate around the axis D within the limits imposed by the dimensions of the aperture 58 engaged by the end portion 72, and can translate longitudinally, within the limits set by the length of the slot 70, between an advanced position illustrated in FIG. 6, in which it is disposed with its own end portion 72 projecting from the shell 46 and in lateral contact with the free end of the arm 61 of the lever 50, and a withdrawn position illustrated in FIG. 5, in which the end portion 72 is spaced from the free end of the arm 61.

The lever 51 is kept in position by a traction spring 69 of a conventional type, in an angular position of rest (FIGS. 5 and 6), in which its own end portion 72 is disposed such that it abuts a lateral edge of the aperture 58.

Finally, the lever 51 has a control arm 73 which is opposite the end portion 72 and can co-operate with the levers 52, 55, respectively for inner and outer control, as will be described in detail hereinafter.

The inner control lever 52, which is advantageously made of plastics material, is pivoted around the pin 71 and extends on a plane which is interposed between the planes on which the plate 48a and the lever 51 lie, and parallel to the latter.

The lever 52 has a control arm 75 which projects outside the shell 46, through a corresponding slot, and can be connected via the connection tie rod 54, to the inner handle 53 of the door 2.

The lever 52 is kept, by a spring which is of a conventional type, and is not illustrated, in a position of rest (FIGS. 5 and 6), in which the arm 75 abuts laterally the edge of the slot of the shell 46 from which it projects. The arm 75 has a protrusion 76 which can co-operate in a thrusting manner with the arm 73 of the lever 51, in order to rotate the latter around the pin 71.

Finally, the lever 52 has an end portion 77 in the form of a cam, opposite the arm 75, with a substantially trapezoidal shape, the purpose of which will be explained hereinafter.

The outer control lever 55, which is advantageously made from metal plate, by being pressed and punched, also has an elongate shape and extends predominantly along a plane which is parallel to the levers 51 and 52, and is interposed between the planes on which the plate 48a and the lever 52 itself lie.

The lever 55 is pivoted on the plates 48a, 48b, at one of its own ends, by means of a pin 78 with an axis E, which is at right-angles to and integral with the plates 48a, 48b themselves, and has a control projection 79 which extends in a projecting manner from its own opposite end, which extends outside the shell 46, through an aperture 80 in the plate 48b (FIG. 3), and is connected to the transmission 57. The lever 55 defines a rounded protrusion 81 which can co-operate in a thrusting manner with the arm 73 of the lever 51, in order to rotate the latter around the axis D.

The lever 55 is normally kept, by a spring of a type which is known and is not illustrated, in a position of rest (FIGS. 5 and 6), in which the projection 79 co-operates by abutting against an edge of the aperture 80 of the shell 46.

The actuating assembly 21 additionally comprises a security lever 82, which is pivoted around a pin 83 which is fixed to the plates 48a and 48b, and has an axis F which is parallel to the axes C, D, E. The lever 82 extends on a plane which is parallel to the planes on which the levers 51 and 52 lie, and is disposed on the side of the lever 52 which is opposite that of the lever 51.

The lever 82 is preferably made from metal plate, by being sheared, and has a shape substantially in the form of a cross, with an intermediate portion which is pivoted on the pin 83, a first pair of arms 84, 85 which extend on opposite sides of the pin 83, in a direction which is transverse to the lever 51, and a second pair of control arms 86, 87, which extend on opposite sides of the pin 83, in a direction transverse to the arms 84, 85.

The arm 84 has a rounded shape and has a through hole 88 which engages with play from the projecting edge 68 of the slot 70 of the lever 51. The arm 85 is connected to the plate 48a by a bi-stable spring 89, of a known type, which can make stable two different angular positions of the lever 82, which are illustrated in FIGS. 5 and 6, and correspond respectively to a condition in which the security mechanism is applied (i.e. of inhibition of opening of the lock 1 from the exterior of the motor vehicle), and to a condition in which the security mechanism is released (i.e. of enabling of opening of the lock 1 from the exterior of the motor vehicle).

In the position in FIG. 5, i.e. in which the security mechanism is applied, the arm 84 of the lever 82 keeps the lever 51 in its own withdrawn position, by means of the engagement of the projecting edge 68 of the slot 70 in the hole 88. Angular stoppage of the lever 82 is caused by the contact with the projecting edge 68, which in turn abuts the pin 71 which occupies one end of the slot.

In the position in FIG. 6, i.e. the position in which the security mechanism is released, the arm 84 of the lever 82 keeps the lever 51 in its own advanced position, again owing to the engagement of the projecting edge 68 of the slot 70 in the hole 88. The angular stoppage of the lever 82 is caused in this case also by the contact with the projecting edge 68, which in turn abuts the pin 71 which occupies an opposite end of the slot 70.

The control arm 86 has an end portion which is folded at 90°, which projects from the shell 46 through a through aperture 91 provided in the plate 48b, and is connected by means of a tie rod 92 to a key lock 93, of a known type, for application of the security function from the exterior of the motor vehicle, by means of a key.

The arm 87 projects from the shell 46 through an aperture 94 and is connected by means of a tie rod 95 to a knob 96 for application of the security function from the interior of the motor vehicle.

Alternatively, the arms 86, 87 could be connected to the key lock 93 and to the knob 96 by means of respective flexible transmissions of the Bowden type.

A lateral projection 97 of the arm 85, which is substantially parallel to the arm 87, projects from the shell 46 through a respective aperture 98. The projection 97 is used instead of the arm 87 for connection to the knob 96, in the case of a rear lock; both the possibilities of connection are provided in order to use the same lever 82 for the front and rear versions of the lock 1, for reasons of economy of scale.

A tooth 99 extends in a projecting manner from the intermediate portion of the lever 82, in the vicinity of the arm 84, and can co-operate with the end portion 77 in the form of a cam, of the lever 52.

The position of the tooth 99 is such as to intercept the end portion 77 during the path of opening of the lever 52, when the security lever 82 is in the position in which the security mechanism is applied, as will be described in greater detail hereinafter.

The actuating assembly 21 additionally comprises a door-lock actuator 100 which is electrically operated, and is of a known type.

The actuator 100 is accommodated in the shell 46, and comprises a reversible electric motor 101, a gear reducer 102 which has as its output member a toothed segment 103, and a fork-type actuating element 104, which is integral with the toothed segment 103, and is pivoted together with the latter on a pin 105, which has a common axis G, parallel to the axes C, D, E, F. The actuating element 104 co-operates with a post 106, which is supported by the security lever 82, in order to displace the latter, after the motor 101 has been activated, from the position in which the security mechanism is applied, to the position in which the security mechanism is released.

An electrical connector 107, the isolating body of which is integral with the shell 46, permits connection of the motor 101 to the electrical system of the motor vehicle.

Finally, the shell 46 of the control module 17 defines a receptacle 108 for a plurality of micro-switches, of which only one is illustrated in FIGS. 5 and 6 by way of example, and is indicated as 109, which micro-switches can detect the position of mechanical members of the control module 17.

The said micro-switches are electrically connected to a printed circuit 110, which is also supported by the receptacle 108, and are associated with respective levers, each of which co-operates with the mechanical member, the position of which is to be detected. In particular, with the micro-switch 109, there is associated a lever 111, which is pivoted on the receptacle 108, and has an arm in the form of a fork, which is connected to a post 112, which is supported by the security lever 82, and a control arm for the micro-switch 109 itself, which has a profile in the form of a cam. The micro-switch 109 thus detects the position of the lever 82 and switches during the path of the lever 82, between the position in which the security mechanism is applied, and the position in which the security mechanism is released, such as to generate for example an electrical signal of activation, for central locking of all the locks of the motor vehicle.

The printed circuit 110 is connected to the electrical system of the motor vehicle by means of an electrical connector 115, the isolating body of which projects outside the shell 46.

According to a preferred embodiment of the present invention, the handle 53, the key lock 93, and the knob 96, are supported directly by the plate 45, and constitute together with the latter and with the control module 17 a functional unit 120, which can be pre-assembled before being fitted inside the dry region 14 of the cavity 10.

In addition, according to a possible variant, not illustrated, the inner handle 53 could be integrated with the control module 17, with direct connection to the inner control lever 52, i.e. without needing the tie rod 54, or other types of transmission. Similarly, the key lock 93 could also be integrated with the control module 17, and the control of the security function from the interior of the motor vehicle could be incorporated in the inner handle 53.

Finally, as a result of the integration between the control module 17 and the key lock 93, the micro-switch 109 for detection of the command for application of the security function could be associated directly with the key lock 93.

The functioning of the lock 1 is described starting from the configuration of closure with the security function released, corresponding to the position of the closure mechanism 19 illustrated in FIG. 4, and to the position of the actuating assembly 21 illustrated in FIG. 6.

In the position of the closure mechanism 19 in FIG. 4, the striker 3 is locked in the seat 34 of the fork 30, rotation of which around the axis A is prevented by the engagement element 40 of the pawl 31. This position can be obtained, conventionally, simply by closing the door 2.

The lock 1 is opened from the exterior of the motor vehicle by using the outer handle 56, and thus, by means of the transmission 57, by using the outer control lever 55. Rotation of the lever 55 anticlockwise around the axis E gives rise to an action of thrusting of the protrusion 81 on the arm 73 of the lever 51, which is then rotated clockwise around the pin 71; during rotation of the lever 51, the end portion 72 co-operates with the arm 61 of the lever 50 by thrusting, thus generating traction on the cable 65 of the transmission 23, with consequent activation, by means of the projecting part 43, of the engagement element 40 of the pawl 31. In particular, the engagement element 40 rotates around the axis B, against the action of the spring 41, thus becoming released from the fork 30, which is therefore free to rotate towards its own position of opening, under the thrust of the spring 37, and releases the striker 3.

Application of the security function can take place from the exterior of the motor vehicle by means of a key, or from the interior by means of the knob 96. In the first case, the key acts, by means of the tie rod 92, on the arm 86 of the security lever 82, and gives rise to rotation of this lever clockwise around the axis F, from the position in which the security mechanism is released (FIG. 6), to the position in which the security mechanism is applied (FIG. 5). As a result of this rotation, the post 112, by being displaced, gives rise to rotation of the lever 111, with consequent switching of the micro-switch 109; the electrical signal for activation of central locking of all the locks of the motor vehicle is then generated. In the case of the lock 1, the security lever 82 is activated simultaneously, either by means of the action of the key on the arm 86, or by means of activation of the electric motor 101 of the door-lock actuator 100.

The rotation of the security lever 82 displaces the lever 51 from the advanced position (FIG. 6) to the withdrawn position (FIG. 5), thus misaligning the end portion 72 of the lever 51 itself from the arm 61 of the lever 50; therefore, by acting on the outer control lever 55, unloaded displacement takes place of the lever 51, which cannot co-operate with the lever 50.

The security function is applied from the interior of the motor vehicle by means of the action of the knob 96 and the tie rod 95 on the arm 87, in the case of the front door, or on the projection 97, in the case of the rear door; in both cases this gives rise to displacement of the lever 82, which is identical to that which occurs in the case of application of the security function by means of a key.

Opening from the interior of the motor vehicle takes place by using the inner handle 53 to act on the inner control lever 52, thus giving rise to rotation around the pin 71, in the clockwise direction shown in FIGS. 5 and 6.

If the security function is applied (FIG. 5), during a first portion of the angular displacement of the lever 52 around the axis D, the end portion 77 in the form of a cam, of the lever 52 itself, co-operates by thrusting, with the tooth 99 of the lever 82, until the lever 82 itself is taken into the position in which the security mechanism is released. From this point onwards, the protrusion 76 of the lever 52 co-operates with the arm 73 of the lever 51, thus, similarly to the process previously described with reference to opening from the exterior, giving rise to displacement of the lever 50 around the axis C, and to release of the engagement element 40 of the pawl 31, from the fork 30.

Opening takes place in a similar manner when the security function is not applied (FIG. 6); in this case, there is a first section of unloaded rotation of the lever 52, until the protrusion 76 comes into contact with the arm 73 of the lever 51.

Figure 7:
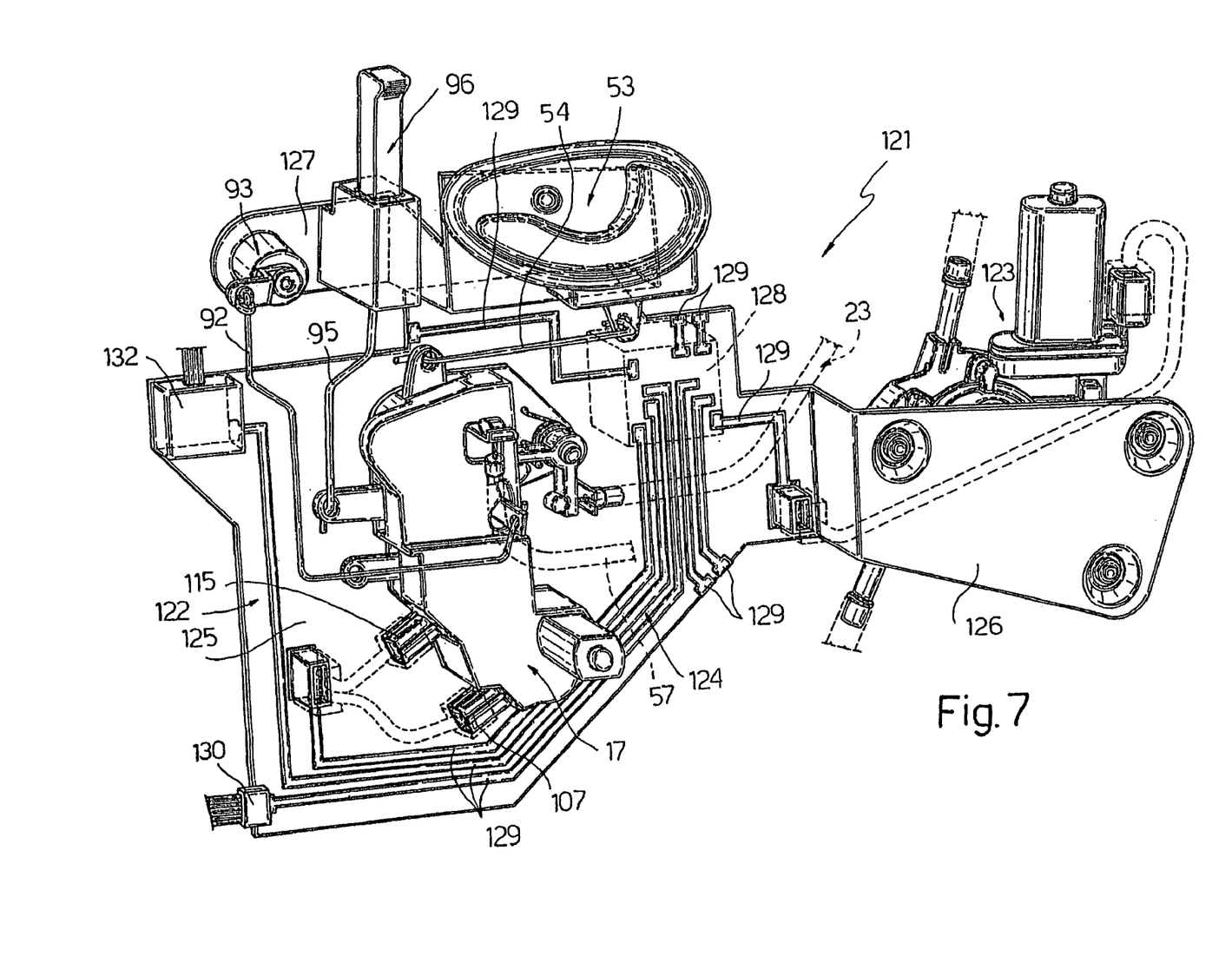
FIG. 7 illustrates a possible variant of the pre-assembled functional unit in FIG. 1.

The variant illustrated in FIG. 7 relates to a pre-assembled functional unit 121, which is similar to the unit 120, and the component parts of which are indicated, where possible, with the same reference numbers as the corresponding parts of the unit 120 itself.

The unit 121 is accommodated inside the dry region 14 of the door 2, and comprises a support plate 122, which, similarly to the plate 45, can be connected integrally with the inner panel 9 of the door 2, and supports the control module 17, the inner handle 53, the key lock 93 and the knob 96 for application of the security function of the lock 1, from the interior of the motor vehicle.

The plate 122 additionally supports an electrically controlled glass-raising device 123, which is known and is not described in detail, and a printed circuit 124, in order to connect the electrical system of the motor vehicle electrically to the control module 17, to the glass-raising device 123, and to a series of electrical uses which are associated with the door 2, such as a device for adjustment of the inclination of the rear-view mirror (not illustrated), and switches or push buttons (also not illustrated), to carry out different functions.

In particular, the plate 122 substantially comprises a main, flat, polygonal portion 125, on which the control module is secured, and a pair of projections 126, 127, which extend in a projecting manner from the main portion 125 and support respectively the glass-raising device 123, and the key lock 93 and knob 96.

The printed circuit 124 substantially comprises a device 128 for peripheral control of the functions of the door 2, which is commonly known as the "door node", and is secured to the main portion 125 of the plate 122, and a plurality of conductive tracks 129, which are advantageously made of copper, extend from the control device 128 and are secured, preferably by being pressed jointly, directly onto the main portion 125 of the plate 122. Alternatively, the conductive tracks 129 could be supported by a flexible sheet element made of an isolating material (not illustrated), and generally a plastics material, which is commonly known in the industry as "flexfoil", and which in turn can be secured to the main portion 125 of the plate 122.

Purely by way of example, some conductive tracks 129 (of which only one is illustrated for the sake of simplicity in FIG. 7), connect the control device 128 to a connector 130, which is secured to the main portion 125 of the plate 122 and can be connected in turn to the electrical system of the motor vehicle, others (only one of which can be seen in this case also) connect the control device 128 to the connectors 107 and 115 of the control module 17, and yet others (also in this case only one of which can be seen in FIG. 7) connect the control device 128 respectively to the glass-raising device 123 and to a connector 132 which is designed to be connected in turn to the device for adjustment of the angle of the rear-view mirror which is associated with the door 2.

In the case of motor vehicles which are provided with central locking systems for the doors 2, of the passive entry type, i.e. systems which can identify the user electronically during actuation of one of the outer handles of the doors, and can command opening of the corresponding locks only in the case of positive identification of the user himself, the plate 122 could also support the control device for the system itself.

An examination of the characteristics of the lock 1 and of the door 2 produced according to the present invention shows the advantages which the invention makes it possible to obtain.

In particular, as a result of the remote connection between the actuating assembly 21 and the closure mechanism 19, by means of the transmission 23, the positioning of the control module 17 inside the cavity 10 of the door 2 is independent from that of the closure module 16, which in turn is dependent on the position of the striker 3. This leads to reduced dimensional and design constraints for production of the control module 17, and to the possibility of accommodating this module in the most favourable position inside the cavity 10 of the door 2, for example in the innermost, dry region 14, such that it is not necessary to use impermeable electric components, which are decidedly costly, and, simultaneously, of reducing drastically the risks of forced entry, with consequent reduction of the costs necessary for the design, production and fitting of systems to prevent forced entry.

In addition, the control module 17 can be disposed in a position closer to the hinge side of the door 2, with consequent reduction of the inertia stresses derived from closure of the door 2 itself.

Finally, as a result of the independence of the closure module 16, the control module 17 can be located inside the cavity 10 of the door 2, in a position which permits integration with other components supported by the door 2 itself, thus providing pre-assembled functional units which can easily be fitted on the latter. In particular, as illustrated in FIG. 7, functional units can be produced in which the door node (control device 128) is integrated directly in a support member (plate 122), and the connections between the door node and the various electrical or electronic components which are associated with the door 2 are produced by means of a printed circuit 124, which is secured to the support member itself.

By this means, it is possible to reduce the wiring of the entire door 2, and to permit placing of all the electrical and electronic components in the dry region 14 of the door 2 itself.

It is apparent that modifications and variations can be made to the lock 1 and to the door 2, which do not depart from the protective scope of the present invention.

The invention claimed is:

1. A door (2) for a motor vehicle, having a lower box-type portion (7) which defines a cavity (10) to accommodate a modular lock (1) in turn comprising a closure module (16), a control module (17) and remote connection means (22) interposed between said modules (16, 17), said closure module (16) comprising a first support body (18), which is secured to said lower box-type portion (7), and a closure mechanism (19) which is supported by said first support body (18) and can be releasably connected to a striker (3), which is integral with an upright of said door (2) in order to give rise to closure of the door (2) itself, said control module (17) comprising a second support body (20), which is also secured to said lower box-type portion (7), and an actuating assembly (21) which is supported by said second support body (20) and comprises a plurality of levers (50, 51, 52, 55, 82) for controlling release of said closure mechanism (19) from said striker (3), said remote connection means (22) connecting said actuating assembly (21) and said closure mechanism (19) in order to permit remote positioning of said closure and control modules (16, 17) on said door (2), said lower box-type portion (7) is subdivided by a baffle (13) which is impermeable to water, into a dry region (14), which faces the interior of the motor vehicle, and a humid region (15), which faces the exterior of the motor vehicle, and in that said closure module (16) is accommodated in said humid region (15) to cooperate with said striker (3) and said control module (17) is accommodated in said dry region (14) and includes unsealed electric components (100, 109, 110, 124), said remote connection means (22) passing through said baffle (13) to connect said modules (16, 17), and a pre-assembled functional unit (121) accommodated inside said dry region (14) and in turn comprising a support member (122), which can be connected integrally to an inner panel (9) of said door (2) and supports said control module (17), an electrically controlled glass-raising device (123), and printed circuit means (124) for connecting at least said control module (17) and said glass-raising device (123) electrically to the motor vehicle.

2. A door according to claim 1, characterised in that said remote connection means (22) comprises a flexible transmission (23).

3. A door according to claim 2, characterised in that said transmission (23) comprises a sheath (62) and a cable (65) which slides inside said sheath (62), and has opposite ends which are connected respectively to an output member (50) of said actuating assembly (21), and to an input member (31) of said closure mechanism (19).

4. A door according to claim 3, characterised in that said closure mechanism (19) comprises a fork (30) which is pivoted on said first support body (18) and defines an engagement seat (34) for said striker (3), and a pawl (31) which is also pivoted on said support body (18) and cooperates with said fork (30), in order to lock said closure mechanism (19) such that said fork (30) can be released in a position of closure on said striker (3), said pawl (31) defining said input member of said closure mechanism (19).

5. A door according to claim 4, characterised in that said printed circuit means (124) comprises a plurality of conductive tracks (129), which are secured directly to said support member (122).

6. A door according to claim 5, characterised in that said conductive tracks (129) are pressed jointly onto said support member (122).

7. A door according to claim 6, characterised in that said support member (122) has an attachment section (127) for manual control means (53, 93, 96) which are associated with said door (2).

* * * * *